United States Patent [19]
Conlan et al.

[11] Patent Number: 5,573,082
[45] Date of Patent: Nov. 12, 1996

[54] MANUAL FOOD SERVICE SYSTEM

[75] Inventors: John T. Conlan; Thomas J. Conlan, both of Milwaukee, Wis.

[73] Assignee: Diner-Mite, Inc., Milwaukee, Wis.

[21] Appl. No.: 472,440

[22] Filed: Jun. 7, 1995

Related U.S. Application Data

[60] Division of Ser. No. 483,940, Feb. 23, 1990, which is a continuation-in-part of Ser. No. 87,612, Aug. 20, 1987, abandoned.

[51] Int. Cl.⁶ .................................................. A47F 10/06
[52] U.S. Cl. .............................................. 186/44; 312/198
[58] Field of Search .................................. 186/39, 40, 41, 186/44, 38; 312/137, 140.1, 140.3, 140.4, 198; 52/33

[56] References Cited

U.S. PATENT DOCUMENTS

| | | | |
|---|---|---|---|
| 2,894,604 | 7/1959 | McMillan | 312/137 X |
| 3,170,541 | 2/1965 | Werner | 186/44 |
| 4,154,027 | 5/1979 | Searcy | 52/33 |
| 4,245,720 | 1/1981 | Neill | 186/38 |
| 4,675,515 | 6/1987 | Lucero | 186/41 |

Primary Examiner—F. J. Bartuska
Attorney, Agent, or Firm—Foley & Lardner

[57] ABSTRACT

A manual food service system is provided for precluding a food server from touching currency or other items which may contaminate food. The system includes food preparation and assembly stations cooperable with an order payment station for receiving a token representing a certain value, for determining and updating the value of the token to account for the cost of an entered food order.

2 Claims, 4 Drawing Sheets

MANUAL FOOD SERVICE SYSTEM

RELATED APPLICATIONS

This application is a divisional of application 07/483,940, filed on Feb. 23, 1990, entitled "Manual Food Service System," which is a continuation-in-part of application Ser. No. 07/087,612, entitled "Manual Food Service System," filed on Aug. 20, 1987 (now abandoned), and of PCT/US88/02861, filed Aug. 19, 1988.

TECHNICAL FIELD

The present invention relates, generally, to a manual food service system adapted for delivering foods in the nature of, but not limited to, convenience or so-called "fast foods;" the term "manual food service system" being used herein to connote the handling of unwrapped food items as distinguished from a system in which only wrapped food is contacted, as in a vending system. The present invention relates more especially to an improved system for purveying comestibles in a transaction, whereby a food server is relieved of the need to contact either currency or other items presented by a customer which are or have the potential to be sources of biological contamination of the food items the server also contacts. Thus, the present invention affords the opportunity to increase productivity of a manual food service operation while complying with sanitation requirements by allowing the food server to touch unwrapped food items and deliver food preparations to a customer without encountering such sources of contamination.

DESCRIPTION OF THE BACKGROUND ART

The delivery of restaurant services of all manner and variety is a burgeoning field. Changing life styles have resulted in a tremendous growth in the food service industry. Proportionately, the trend is moving toward a decrease in the number of meals prepared at home relative to those consumed at commercial food service establishments; this is true of all of the traditional meals (breakfast, lunch and dinner) as well as "snacks." Equally important is an appreciation that meals from commercial establishments must be of good quality with a decided preference for freshly prepared, hot meals by many consumers; meals served under sanitary conditions. This is true whether one looks to conventional meals or snacks.

The combination of factors outlined above has tended to impact on most restaurant businesses, including the now ubiquitous fast-food restaurants. The classic mode of delivering meals or other food preparations centers around a kitchen area in which one or more individuals attend to food preparation under controlled sanitation conditions and a food delivery area in which customers are served those preparations. Most often, there is also an area in which the customer will consume the purchased food preparations and that may constitute yet another distinct zone of operation within a restaurant for purposes of analyzing the delivery of food services.

Quality of food service demanded by today's consumer is a multifaceted issue. Apart from personal taste and the aesthetic presentation of a meal, health interests dominate this business. Perhaps nowhere else in local government is the concern for delivery of a safe product greater than in delivering food; food preparation areas are subject to strict health codes and regulations, cleanliness of those areas is a subject of continual governmental inspection, the quality of food items comprising the meal to be delivered is subject to close scrutiny, the manner in which food products are handled is carefully regulated, the personal health habits of individuals contacting food preparations at any stage of the process is a matter of grave concern, to name but a few of the issues which must be addressed in this business. Related to the full panoply of appropriate anxiety respecting the preparation and delivery of food to consumers, it is further pertinent to observe that much of the organizational hierachy in a typical restaurant is dictated by a specific concern over health hazards-one who touches unwrapped food must wash or protect his hands every time he contacts currency. That is one of the principal reasons why those individuals who prepare food are precluded from direct interaction with customers. Rather, waiters or other servers provide a buffer between the food preparation zone and the payment or delivery zone of a traditional restaurant, whether or not it is operating as a fast food restaurant.

For these and other reasons, one can readily appreciate the great inefficiencies that would be associated with the operation of typical fast food restaurants or convenience stores where the tasks of food preparation and money handling are combined. It is generally considered unworkable because more time ultimately will be spent cleansing the server's hands of potential contamination (or removing gloves worn to protect the server's hands from contamination), a sanitary and health-code imposed task, than either delivering food or collecting money, a business imposed task if that business is to be operated productively. On the other hand, it is generally regarded as unworkable to rely on self-regulation; both design and policing or the threat of policing compliance with health regulations are required or compliance will typically not be achieved. As will be seen from the ensuing discussion, the present invention obviates these historical problems without sacrificing either safe health practices, operator efficiency or profitability; to the contrary, improving all. This is achieved, in part, by a system in which the delivery of a comestible product occurs in a preferably cashless transaction. For purposes of broader understanding of the implications of that mode of operation, a brief review of certain prior art may be helpful.

U.S. Pat. No. 4,128,757 concerns the delivery of food items, expedited by a particular customer-initiated ordering system. The approach suggested in the '757 patent entails the use of a punchcard which is comprised of a generally opaque web bearing indicia which identify menu items and an array of punchout blanks which may be removed by a customer desiring to order a correlated item. The blanks are arranged in a specific configuration so that the card may be scanned photo-optically. Thus, a customer's selection of certain menu items can be registered electronically to achieve the objective of a customer-initiated ordering system.

In one aspect of the system disclosed in the '757 patent, computer means are electrically coupled to the photosensitive detectors which scan and decode the information encrypted onto the web by the customer's selective removal of punchouts. In this way, information relating to the order may be displayed at any of a number of remote or other desirable locations to facilitate the assembly and delivery of the desired food items. An employee of the restaurant fills the order and delivers the requested food items to a distribution area where the customer may be served. The use of a computer also tends to provide a means by which inventory control may be maintained and product statistics collected should the restaurant operator be so inclined. Although this system undoubtedly operates efficiently for its intended purpose, it does not address the underlying problem noted above; some type of buffering activity is necessary to separate those who prepare the food from a customer passing money in payment for that food since those in the food preparation area may not handle or otherwise contact currency or similar sources of potential biological contamination. See also the food delivery system described in German Patent DE-B-2 319 040.

A vending format for the delivery of wrapped food items is the subject of U.S. Pat. No. 4,361,754. The implementation suggested there is the replacement of a typical coin-operated vending mechanism with what those patentees dub a "record-operated" control system. In that instance, a card (or record) is encoded with information representing the value of money, typically via the use of a magnetic strip which is encoded by an appropriate writing mechanism. The encoded card is disposed within a reader associated with a vending machine. The reader decodes magnetic indicia resident on the card to ascertain whether sufficient value is present to enable a vending operation. If there is, the customer may obtain an item from the vending machine in the ordinary manner and the "record" will be updated to reflect the purchase. The '754 patent is highly specific to the circuitry involved in implementing the aforementioned concept and, thus, bears little relationship to the present invention beyond those conceptual terms.

Another system concerning the delivery of food services and the use of an encoded token is disclosed in U.S. Pat. No. 3,754,119. That patent relates to an apparatus for tabulating information contained on a ticket which includes a magnetically encoded strip. The disclosed invention particularly concerns a ticket which might be utilized by a school child participating in a subsidized food program, in which case the ticket is specially encoded to contain information regarding that child's individual entitlement. The card described in the specification of the '119 patent contains a plurality of magnetically encoded strips, one of which is severed from the card or ticket by the apparatus employed to read the data represented on the strips. In that instance, the apparatus is only capable of reading information, not writing or otherwise encoding information on the card.

Background patents which concern electronically or magnetically encoded cards or tokens which represent money or money's worth include U.S. Pat. Nos. 4,614,861, 4,458,142, and 3,984,660. Those patents relate to devices for encoding information on such a card and controlling its disposition when the card is put to use involving, for example, so-called "smart cards." Still other background references include U.S. Pat. Nos. 4,562,490 and 4,599,510 which relate to apparatus used to read and/or write information onto such cards or tokens, and to update the information represented thereon.

The prior art discussed above reflects a failure to appreciate fundamental sources of inefficiency in the delivery of food services. The art has, to date, failed to provide a unified food preparation and delivery system in which a food service operator who is required to contact unwrapped comestibles is freed from the need to contact money or other items presented by a customer which are or have the potential to be sources of biological contamination. Thus, the art has failed to materialize a system which permits the efficient delivery of food services by a single operator, requiring instead that several zones of operation be maintained to buffer food preparation from cash collection. Economics have denied sanitary, manually-delivered food service to a large segment of the consuming public.

SUMMARY OF THE INVENTION

The present invention responds to the deficiencies of the prior art. Advantageously, a system in accordance with the present invention facilitates a preferably cashless transaction in the delivery of food items or otherwise in the delivery of food services. By virtue of a particularly preferred implementation, in which an updatable token is employed, other advantages accrue as well. For example, cash management of a food service operation is consolidated, thereby obviating money handling problems apart from those problems independently associated with the transfer of potential biological contamination. Additionally, greater economies are realized by providing a manual food service facility which can productively be operated by a single server; in many applications the need to employ separate cashiers and cooks would be too great of a financial penalty. In still another aspect of the present invention, with particular regard to a preferred mode of implementation, additional advantages result from a modular construction which simplifies the disposition of food service facilities at convenient locations within a building.

The foregoing, and other advantages or benefits, are realized through a manual food service system which is comprised of an array of food preparation and assembly stations defining an operation zone in which an operator contacts, assembles or otherwise produces, unwrapped comestibles in prepared or unprepared form and from which the operator delivers a requested food product to a customer at a customer delivery station proximate that operation zone; at least one interactive order entry station, including order entry means in operative communication with the operation zone for placing an order for the requested products and advising the operator thereof; at least one interactive order payment station, including order payment means in operative communication with the operation zone for paying the cost of the requested comestible products and advising the operator thereof, wherein the payment means is comprised of decoding means for ascertaining the value of money or money's worth encoded on or represented by a token member presented by the customer; whereby the operator may be apprised of a customer order and the acknowledgment of payment thereof from a position within the operation zone and may deliver the order to the customer delivery station without contacting any item transferred from the customer in payment therefor.

One or both of the order entry means and order payment means may be disposed at a site remote from the operation zone to expedite the flow of customer traffic. Likewise, both the order entry means and the order payment means may be integrated into a single unit should that meet the operational objectives of a given installation. In either event, however, it is preferred that the customer utilizes a token which is encrypted with value indicia such as, for example, a token known generally in the industry as a "debit card" (although, that may be a misnomer, in the sense that the token is more accurately viewed as a "cash card"). In that case, the order payment means comprises a decoding means for receiving the token, ascertaining the value represented thereby and appropriately updating that value in response to an order placed by the customer through the order entry means. This is further implemented through the use of suitable read/write heads which update the value of the debit card through an appropriate write head associated with apparatus responsive to a customer's deposit of currency. A read/write head in operative association with the order means translates the cost of a particular customer order into a debiting function and updates the card in response thereto.

Alternatively, the token may assume the form of a credit card, in which case the afore-described decoding means would update the value of the token by debiting an account such as with a financial institution based on the cost of the particular customer order. In the event cards are not utilized for whatever reason, the token may also take the form of currency, the value of which is reduced via the decoding means by the cost of the order, and returned to the customer without handling by the food service personnel.

Remote siting of order entry and/or order payment means vastly increases the potential for manual food service facilities in accordance with the present invention. Customers may place orders at any of a number of conveniently located stations integrated within the system, for observation by the operator within the operation zone of the system. The operator also receives confirmation of payment prior to assembly of an order and delivery thereof to a customer station for its retrieval by the customer.

Advance ordering is also facilitated by the present invention, the effect of which is to smooth peaks during high demand times. In all of these operations, the food service operator is free to assemble or otherwise attend to the preparation of fresh food items without the loss of efficiency resulting from the need to cleanse his hands due to repetitive handling of currency or the like.

Other advantages of the present invention, and a fuller appreciation of its construction and mode of operation, will become apparent upon an examination of the following detailed description of preferred embodiments, taken in conjunction with the figures of drawing.

DETAILED DESCRIPTION OF PREFERRED EMBODIMENTS

The present invention relates to a manual food service system and, more especially, to one specifically configured to provide a preferably cashless transaction whereby a food server is relieved of the need to contact currency or the like contemporaneously with the preparation or delivery of unwrapped food items to a customer. Accordingly, the present invention will now be described with reference to certain preferred embodiments within the aforementioned context; albeit, those skilled in the art will appreciate that such a description is meant to be exemplary only and should not be deemed limitative.

Figure 1:
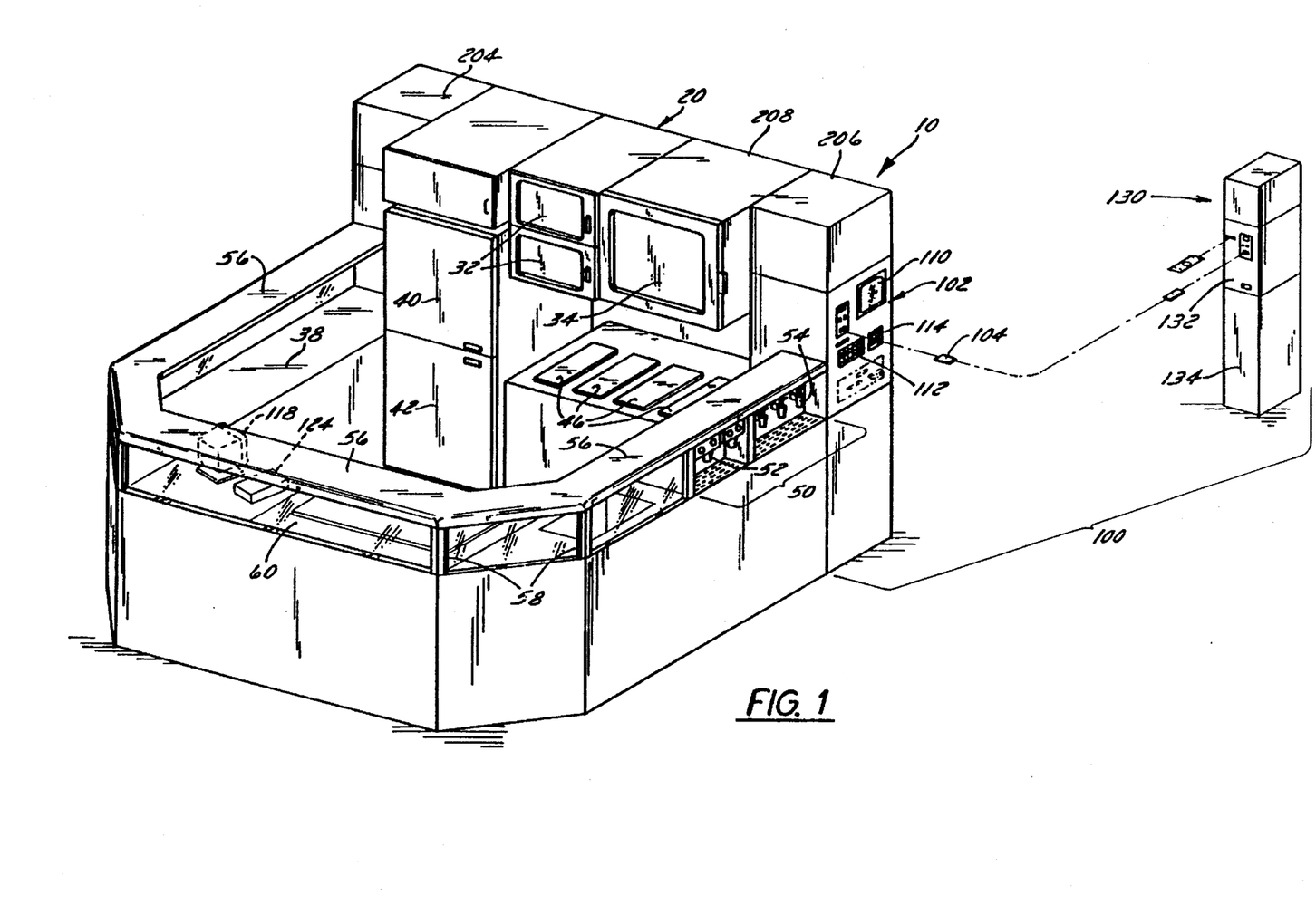
FIG. 1 is a perspective view of a manual food service system in accordance with the present invention, illustrating an operation zone within which a server may prepare food items, a customer delivery zone proximate that operation zone, and an interactive order entry and payment station facilitating a preferably cashless transaction.
Figure 2:
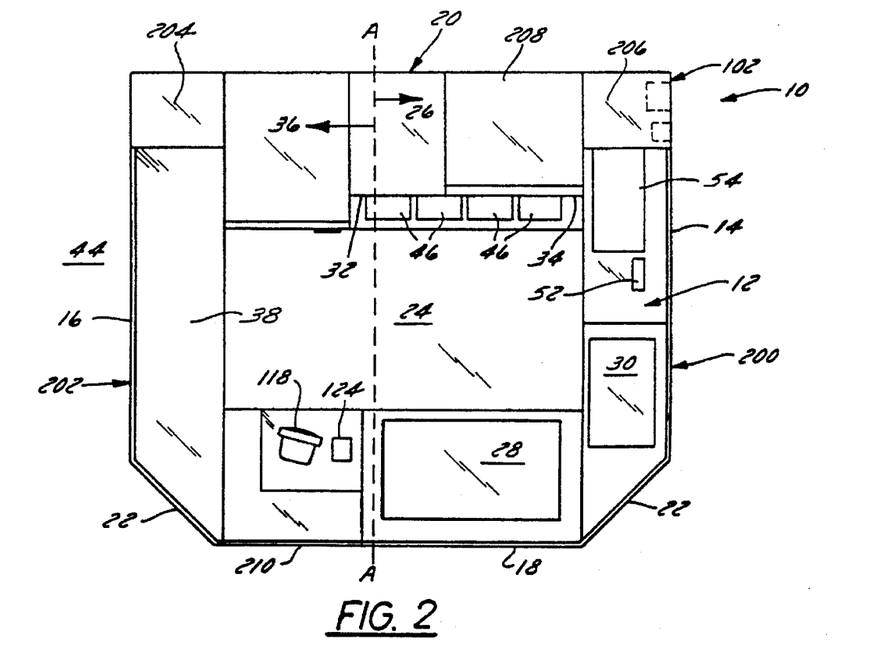
FIG. 2 is a top plan view, with parts broken away, showing the operation and customer delivery zones.

Turning to the figures of drawing, in each of which like parts are identified with like reference characters, FIGS. 1 and 2 best illustrate a preferred form of a manual food service system in accordance with the present invention, designated generally as 10. In the illustrated embodiment, the system is comprised of a manual food service counter identified generally as 12, here shown to have an overall rectilinear profile including opposed service walls 14 and 16, a front wall 18, rear wall 20 and a pair of slant walls 22. An array of food preparation and assembly stations is disposed about the perimeter walls 14–22, defining (collectively) an operation zone 24 within which a server moves to prepare food products and assemble menu items to provide a customer order, as described more fully hereinbelow.

The food preparation stations center about a cooking zone 26, which constitutes about 50% of the operation zone 24, as shown to the right of line A—A in FIG. 2. Within the cooking zone will be found, in this exemplary embodiment, a first cooking apparatus or device 28; depending upon the configuration of the counter 12 and the type of menu items to be delivered, the device 28 may be a roasting unit, a warming unit, a grill, or the like (it could equally well be a cold make-table at the designer's option). Preferably, a hot well 30 is provided, in this instance adjacent the cooling unit 28 along the service wall 14. Such a well is useful for maintaining soups or similar food items at a desired temperature. Cooking appliances 28 and 30 are augmented by ovens disposed along the rear wall 20. In the illustrated embodiment, these ovens include a pair of microwave ovens 32 and a convection oven 34.

The remainder of the operation zone 24 is principally devoted to an assembly zone identified as 36 in FIG. 2, to the left side of the imaginary line A—A. The server utilizes this space to assemble the components comprising a customer's order, obtaining appropriate food items, such as hot sandwiches, soup, etc., or the individual components thereof (e.g., those necessary to make a desired sandwich), from the cooking and preparation zone 26. The assembly zone 36 advantageously includes a large counter area 38 to allow the server space to assemble a number of orders concurrently. The assembly zone further includes refrigeration devices, such as a refrigerator 40 and freezer 42, for preserving perishable comestibles. A customer delivery station 44 is advantageously located adjacent the service wall 16, itself proximate the assembly counter 38. The operation zone 24 further includes a bank of sinks 46, in which the server may clean utensils, cooking implements and the like.

The service wall 14 is illustrated to include a beverage service zone 50. In this instance, beverage zone 50 is segmented into a first array of nozzles 52 for serving soft drinks and a second array 54 for coffee and hot water. The beverage service zone is disposed to face the customer side of the counter 12, allowing the customer to obtain beverages included within that customer's order. This may be provided on a "honor" basis, trusting the customer to procure only beverages for which the customer has previously paid. Alternatively, the customer may be unable to obtain an appropriate cup for the desired beverage, except from the server who will first require some evidence of payment prior to providing that item. In either event, however, the preferred implementation of the system 10 permits the customer to obtain beverages, freeing the server from that task so that his efforts may be applied to food preparation and assembly within the zone 24, ultimately delivering the customer's order to the delivery station 44. As is best envisioned with reference to FIGS. 1 and 2, there is a minimum of lost motion involved in that overall procedure.

At this juncture, those skilled in the art will appreciate that the operation zone 24 has been described to be comprised of several specifically identified work zones, including a distinct food preparation zone, a distinct food assembly zone, and also a distinct zone for sinks or the like. This is not meant to be a rigid definition of, or restriction on, the functionality of the region in which the food server operates to prepare, assemble and deliver a customer order. Rather, the description is made simply to illustrate the normal range of operations to be undertaken in respect of the preferred implementation of the present invention. Thus, for example, the server could equally well assemble a given customer order wholly within the "preparation" zone 26, and pass the completed order to a customer over wall 14 and, certainly, that would not constitute a departure from the present invention. For further example, many convenience stores (i.e., those selling a wide range of food and soft goods) now sell fresh food items served by the store cashier for consumption by a customer on or off the premises; in such a case, the operation and delivery zones often become or constitute the same physical space in the sense that there are not specifically identifiable zones, rather they overlap into the same region of the store. Accordingly, it is the nature of the preferably cashless transaction in purveying unwrapped food which dominate a consideration of the functionality of the present invention; the description of zones is merely an analytical convenience.

The counter 12 further includes a top rail 56, shown only in FIG. 1. The top rail 56 is preferably a solid panel of either metal (e.g. stainless steel) or laminated wood. It is supported on millions 58 extending from the panels comprising the service and front walls. Glass, plastic panels or the like 60 are disposed intermediate the millions 58 to complete the overall outer assembly of the food service unit. The top rail 56 provides a place for the server to set completed orders for customer retrieval. It also serves an important function as a "sneeze rail," a barrier between the customer zone bounding the operation zone and the comestibles contained within the latter. Because of the barrier effect provided thereby, glass panels 60 are also important in many environments, permitting the customer to observe the preparation of his food order. In this manner, functionality of the unit is maximized without foregoing important aesthetic considerations.

Along these lines, optimal efficiency of a food service unit in accordance with the present invention is provided by achieving a principal objective of the present invention; freeing the server from the need to contact either currency or other items which would customarily be delivered by a customer procuring a meal. Currency is known to be a source of potential biological contamination, providing a substrate for transferring virus or bacteria from the hand of the customer to that of the server. Not only currency is relegated to that role; other forms of payment, such as tickets or coupons create the same potentiality. It is for this reason that servers in a conventional restaurant setting are obliged by health regulations to wash their hands after contacting such items, to cleanse away any transmitted virus, bacteria or other form of potential contamination which may otherwise find itself in the communal food source. Avoiding transmission of potential contamination is achieved in major part by means of an integrated order entry and payment system 100.

Figure 3:
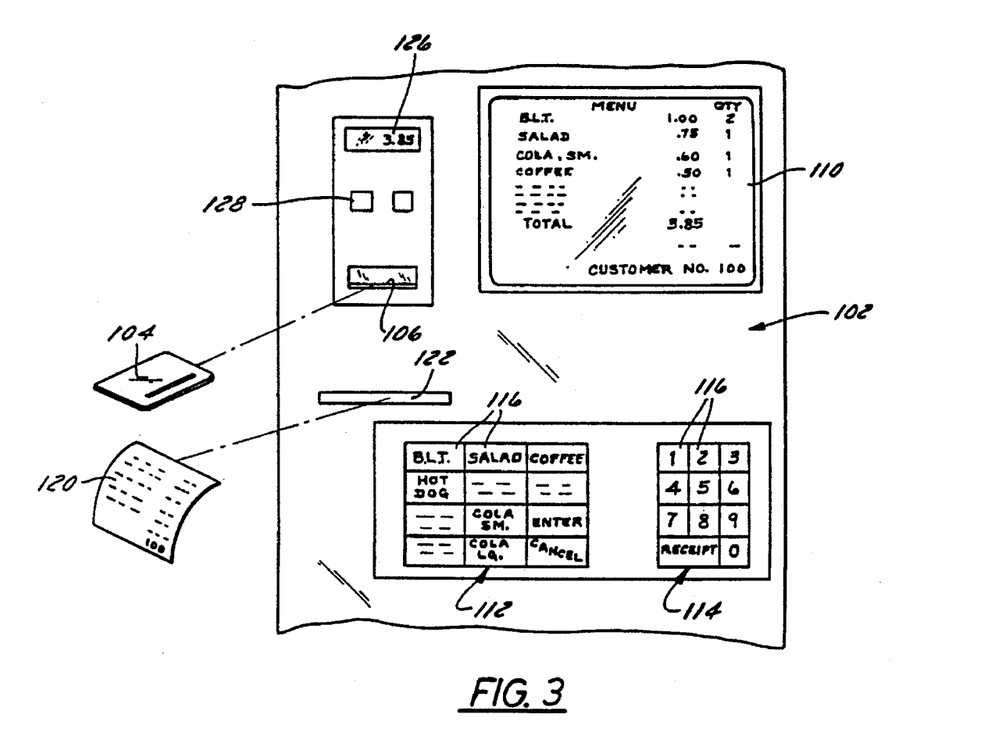
FIG. 3 is an elevation view of a portion of a customer interactive station for order entry and payment.

The order entry and payment station 100 is best visualized in one aspect thereof with reference to FIG. 3. FIG. 3 illustrates a customer interactive station 102 located proximate the service wall 14 in this preferred embodiment. The station 102 is activated by a token 104, shown here in the form a so-called "debit card" or "cash card." The card 104 is typically a plastic card supporting either on its surface or embedded within its thickness means which may be encrypted to represent the value of money or money's worth.

Typically, such a card includes a magnetic strip encoded with a value, for example $10. The card may be updated, either to add or subtract value from that currently resident in the medium in which the value has been encoded (e.g., the magnetic strip). In any of such events, however, the customer activates the system 100 by disposing the token or card 104 into a slot 106 adapted to receive it. The apparatus comprising the interactive station (which itself forms no independent part of the present invention apart from its association in the system 10) includes a read/write device capable of decoding the value encrypted on the token 104. An indicator light 108 signals the customer that the system is ready for operation, that the token 104 is properly located within the device relative to the read/write head and that the customer may proceed to enter an order.

Order entry is provided via an interactive display. The display optionally but preferably includes a CRT 110 which provides a visual indication to the customer of the menu items he has selected, the unit price of each, the quantity desired and the customer order number. This information is displayed in response to a keypad 112 for menu items and a quantity pad 114. The menu pad 112 includes an array of touch sensitive elements 116, collectively corresponding to the published menu for the food service unit. Thus, a touch sensitive element on the keypad 112 is provided for each sandwich, beverage, or other order item which may be selected by the customer, allowing the customer to select menu items by simply touching the appropriate pad element. (The keypad could also be fully integrated with the CRT, using a touch sensitive screen or overlay to select menu items. A voice-actuated ordering system is equally envisioned as within the broadest scope of the present invention.) Simultaneously with ordering, the CRT display 110 presents a visual indication of the menu items selected, requiring the customer to identify next the quantity of that item he desires. That is achieved in a like manner, by touching the appropriate keypad element 116 on the quantity pad 114. When the customer has completed an order, the keypad "ENTER" is touched and the order is transmitted to the server in the operation zone 24, desirably being displayed on a slaved CRT 118 located along the front wall 18 as best viewed in FIGS. 1 and 2.

After preparation of the order by the server, it may conveniently be retrieved at the delivery station 44 upon the customer's presentation of an appropriate receipt for that order. This aspect of the transaction is optionally assisted by providing the customer with a receipt 120 which issues from the unit 102 via a dispensing slot 122. Contemporaneously, a second ticket is optionally, but preferably, generated within the operation zone by a ticket printer 124 located adjacent the CRT 118. By virtue of this correspondence, the server may assemble the proper order as instructed via the CRT display 118 and/or the information printed on the ticket developed via printer 124. That ticket may be matched against the ticket 120 to verify the accuracy of the order and the identity of the customer.

The display associated with the customer interactive station 102 provides a visual indication of the total of the customer order. That same indication is conventionally displayed at panel 126 associated with the card reader. Assuming that the token 104 is encrypted with a value at least equal to the amount of the order appearing on the panel 126, entry of the customer order simultaneously debits the value on the card. In other words, the value encoded on the, e.g., magnetic medium is updated by reducing the previous value by an amount equal to the cost of the customer order. That is achieved by an appropriate write mechanism within the device. Confirmation is provided to the customer upon issuance of receipt 120. At that time, the customer may press a switch 128 which releases the token or card 104, returning it to him for reuse. At any time prior to the entry of the order, the customer may cancel the same by pressing the appropriate region of the keypad 112 (i e., "CANCEL"), restoring the unit to awaiting receipt of order information. Depressing the switch 128 at that time will release the card and deactivate the unit until a subsequent customer arrives.

Figure 4:
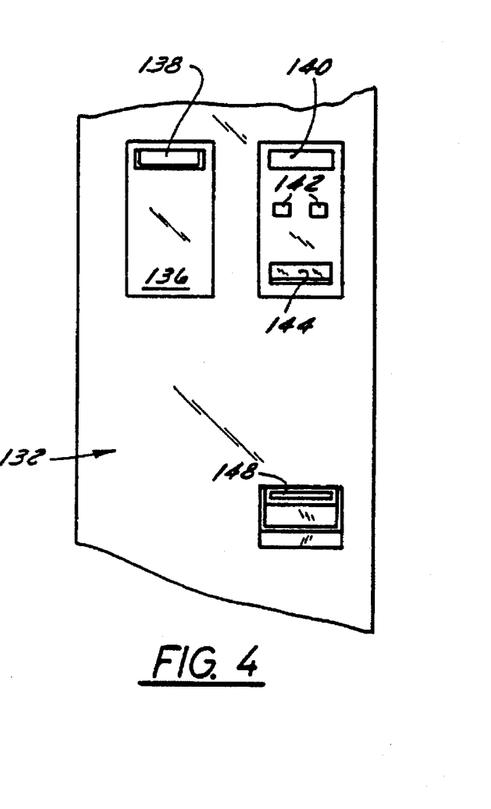
FIG. 4 is a fragmentary, elevation view of a customer interactive station for dispensing tokens.

A related customer interactive unit 130 is associated with the system. The unit 130 is designed to issue tokens of appropriate value and to update the same as desired by a customer. The unit 130 is comprised of a token issuing station 132 positioned on a pedestal 134 at a height convenient for the user. The station 132, best viewed in FIG. 4, is comprised of a currency accepter 136 having a slot 138 within which a customer disposes selected paper bills in an appropriate orientation. The currency accepter 136 is provided with suitable detectors to ascertain both the legitimacy of the bill (i.e., to reject counterfeits) and its value (e.g., $1, $5, $10, etc.). That value is displayed in a window 140. A pair of switches 142 allow the operator to reduce the value to be encrypted on a token to be issued by the unit 132 from the amount deposited in the currency accepter or, having reduced the amount more than desired, to increase it again up to the limit of the amount deposited. When satisfied, the customer depresses switch 144 and a token is issued from a dispenser via a slot 148. Change may be retrieved under appropriate circumstances, from a change return (not shown). In other embodiments, a token which has been used and which then requires added value for continued use may be updated by the same type of unit. In this latter instance, the existing token is inserted into the device through slot 148 and its existing value is added to the value of currency deposited in slot 138.

The unit 100 admits of many options, depending upon the desires of the designer. A permanent plastic card or token 104 may be purchased by the customer for extended use. That purchase may be made from a separate vending machine or through the system 100 itself upon the election of the customer. Alternatively, paper tokens may be issued, again provided with a suitable medium for encrypting value information by way of magnetic, optical, or other detectable medium. A card whose value is depleted over the course of time may be discarded or may have value added to it for reuse, all at the option of the designer.

Figure 5:
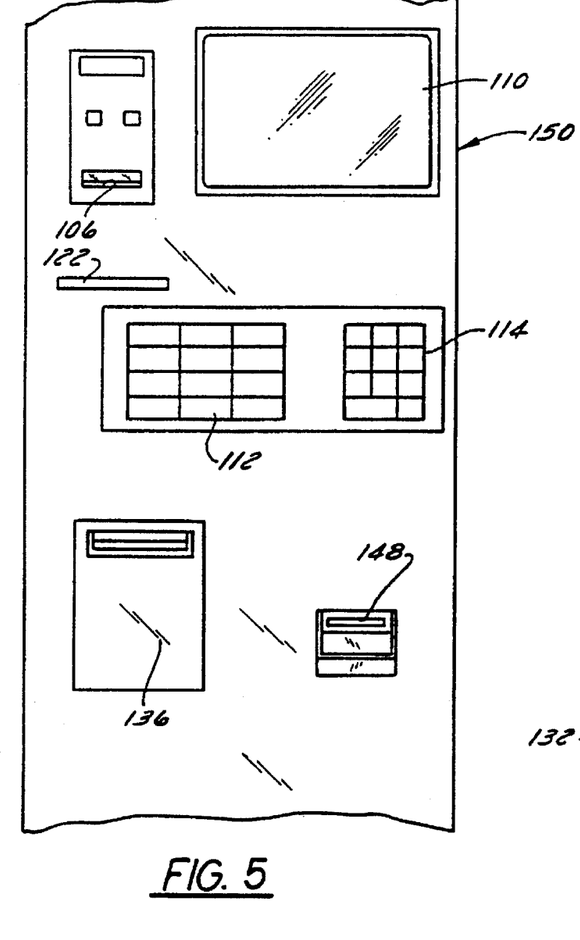
FIG. 5 is an elevation view, similar to FIGS. 3 and 4, but in this instance incorporating a token issuer as well as interactive order and/or payment station.

An alternate embodiment is shown in FIG. 5. In this form of the invention, the functions separately provided by the units 102 and 132 may be combined into an integrated station 150. In this instance, the upper region of the unit 150 is identical to the unit 102 provided for customer order entry and payment. The lower portion corresponds to the currency accepter and token dispenser of unit 132 shown in FIG. 4. The displays and switches of unit 132 are omitted in the embodiment of FIG. 5; the key pad arrays 112 and 114 in combination with CRT 110 serve that function.

The system 100 further contemplates that the token 104 may take the form of a credit card, in which case appropriate means will debit the cost of the food order against an acceptable account the customer keeps with a financial institution and then return the credit card to the customer. If desired, the system 100 may also accept as a suitable token 104, currency which could be directly accepted by means such as the currency accepter 136 modified to reduce the value of a momentary account established by the currency submitted by the amount of the food order and return appropriate change to the customer. In either of these variations, the objective of the invention, to eliminate contact between the customer and food operator of currency or like items transferred in payment for food, is maintainable.

In still another variation deemed within the scope of this invention, the customer may insert his token 104 into the reader 100 and place his order verbally to the operator, who keys in the item comprising it. The operator may then enter the order on interactive station 102, accompanied by an updating of the token and retrieval by the customer, but without touching or otherwise contacting an item which could contaminate the food he handles.

All manner and variety of adaptation are conceivable with respect to the order entry and payment system 100. The convenience of having the order entry station 102 proximate the server expedites the flow of customer business at a time of high traffic such as lunch time. However, were the unit to be put into service in a building, such as an office building, the remote entry of order information from various locations throughout the building may also be a desirable feature. Indeed, since a preferably cashless transaction is contemplated by the system, orders may be placed well in advance from a remote location for delivery either to the customer delivery station 44 at a desired time (to be indicated on the receipts issued by the system) or for remote delivery as may be desired by a system operator. Likewise, just as order entry and payment information may be achieved at or via remote locations, issuance of tokens may be provided at stations physically well removed from the remainder of the system 10. In general, guided by the principles set forth herein, those skilled in the art can design appropriate order entry/ payment systems 100 that will cooperate properly with the food service system 10 as may be desired or required by the exigencies at hand. One such system adaptable for such purposes is that marketed by Interface Control Systems, Inc., St. Louis, Miss., under the name "Plasti-Cash" systems.

As is generally evident from the foregoing detailed description, the system 10 of the present invention is efficient in operation and meets the objective for which it was designed—a preferably cashless transaction in the delivery of food items wherein contact between any item transferred from the customer in payment for food is obviated. The server is free to move about the operation zone 24, between the food preparation area 26 and order assembly area 36. Food items may be cooked and/or maintained in a communal environment in either of the cooking devices 28 and/or 30. Specific food items may be made to order using the ovens 32 and 34. Items not requiring cooking may be maintained readily on hand, under either ambient conditions or the refrigerated conditions provided by refrigerator-freezer 40–42.

The operator is advised of a specific order via the display 118 and has a written indication of that order provided from printer 124. The expanse of counter 38 provides an excellent place for assembling an order. Once the order has been prepared, pairs of tickets (one provided to the customer at time of order payment and a duplicate issued for the server) may be employed to provide verification at the time the server presents the customer with the assembled order at the delivery station 44. Cash for that transaction has previously been transferred to the customer interactive station 130; the token representative of such value remaining with the customer at all times. All material is handed out from the operation zone; nothing is transmitted inwardly to the server. Thus, the server remains free to continue food preparation and assembly in an efficient and sanitary manner in the configuration shown in the figures of drawing.

The exemplary embodiment shown in the figures of drawing is designed for a single server. It has been determined that a single server with a menu designed to maximize both customer appeal and ease of preparation can serve as many as 150 meals per hour or more. For larger operations, the unit 12 may be expanded along service walls, preferably the service wall 16, providing mirror image stations as required to fulfill anticipated business. Simply adding more personnel not only fails to achieve greater volume throughput from a given unit but tends to create the potential for reducing the efficiencies of the system because of the inability of two or more individuals to coordinate activities within the operation zone. Thus, optimally, a single server is associated with each counter 12, whether individually (i.e., in the form shown in the figures of drawing) or with each of a series of adjoining counters in an expanded system. In any of such events, however, the operation and delivery zones are "unbuffered" in the sense of a traditional restaurant, whether fast food or otherwise. In other words, it is not necessary to have a person acting as a buffer between food preparation and food delivery, in operations involving unwrapped comestibles, due to the need to handle currency or the like; for the need to handle currency is obviated.

Still other efficiencies of the present invention evolve from its specific design to accommodate site configuration and customer traffic flow. As is generally apparent from the illustration in FIGS. 1 and 2, the components comprising the overall food service counter 12 are of a modular construction. More specifically, the service wall 14, along with its associated beverage service station 50 and hot well 30, is comprised of a first modular unit 200 extending outwardly along the slant wall to the front wall 18. Likewise, the service wall 16 is comprised of a unitary module extending outwardly from an independent storage module 204, along slant wall 22 to the front wall 18. The storage module 204 is dimensionally identical to an opposed module 206 which houses the order entry and payment station 102, the two modules balancing symmetrically the rear wall 20. That rear wall itself is comprised of a panel 208 which supports the ovens 32 and 34 and provides a splash panel for the sinks 46. Refrigeration units 40 and 42, along with storage module 48, may be attached to that rear panel 208 or may be generally free-standing depending upon the needs or desires of the designer. The front wall 18 is likewise constructed in modular fashion, as a module 210 extending between the two slant walls 22, providing the appropriate location for the cooking device 28 and the responsive displays comprised of the CRT 118 and printer 124. Mullions 58 are designed to interfit with the modular components for the purposes of retaining glass panels 60 and supporting the sneeze rail 56 to comprise the overall assembly 12.

Figure 6:
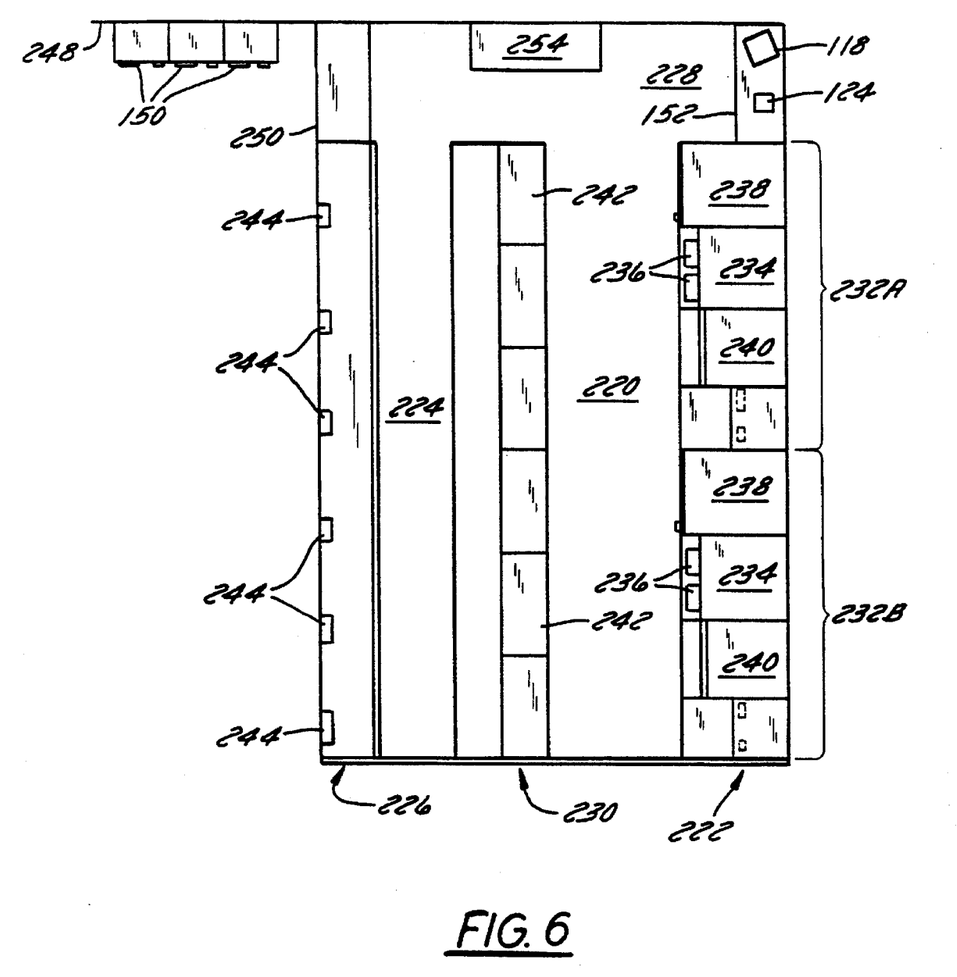
FIG. 6 is a plan view of an expanded system for fast food service.

Another example of an expanded system for fast food service in a high volume application is shown in FIG. 6. In this embodiment of the invention a preparation zone 220 is provided between a food preparation counter 222 and an assembly counter 230. A service zone 224 is provided between assembly counter 230 and a service counter 226. The fast service zone 228 is provided at the end of the preparation zone 220. The food counter 222 includes one or more panels 232A, 232B, each of which supports one or more ovens 234, sinks 236 and a refrigeration unit 238. A grill 240 can also be provided on each panel 232. Comestibles prepared in the preparation zone are wrapped and temporarily stored in racks 242 provided on the assembly counter 230. Orders received by the servers are assemblied on the counter 230 and presented to the customer at the service counter 226. Payment stations 244 of the type described herein, i.e. 130 and 132, can be provided at spaced intervals in counter 226. With this arrangement verbal orders can be given to the servers and payment made at the stations and acknowledged by the server prior to filling the order.

Remote ordering for fast service is provided by a number of integrated stations 150 which are provided along a wall 248 in a spaced relation to a fast service counter 250 provided at the end of the counter 226. Specific orders entered and acknowledged in the integrated stations 150 are shown on a CRT display 118 and/or by a written indication of that order provided from a printer 124, mounted on a counter 252 in the zone 228. The order is filled by an operator in the preparation zone 220 and assembled on a counter 254 provided in the zone 228. Once the order has been prepared it is placed on the counter 250 with the verification confirmed by the tickets provided by the printer 124. With this arrangement the preparation and assembly of the order is handled by an operator from the preparation zone, thus the servers are free to service counter customers directly at the counter 226. The customer has the option of serving himself through the fast order line or verbally presenting his order to the servers at the counter 226. In either instance the payment for the order is handled independently from the server through the payment stations 150 or 244.

Modular construction expands the range of utilities of the manual food service system 10. Transportation and installation are both materially eased because of modular construction and assembly. Furthermore, uniformity of prefabricated construction greatly facilitates the installation of such food service units. Uniformity and location for water supply, waste water discharge and electrification allows site preparation prior to delivery, whereas the modular construction thence simplifies assembly of the components into the overall design.

It is also envisioned that the system of the present invention may be implemented in a broader context in a convenience store or in a similar business establishment in which fresh food products, amongst others, are served for consumption on or off the premises of the store. In a conventional convenience store setting, wrapped food products, health care products, sundry items and the like are sold, as the name tends aptly to imply, on a "convenience" basis for a customer desiring to purchase only a few articles. It has now become relatively commonplace to sell fresh food preparations in a convenience store, including comestibles which are handled by a cashier while the product is unwrapped. There appears no reason to distinguish that type of transaction from a transaction in a restaurant or other location dedicated to food preparation and service. Accordingly, it is deemed within the scope of the present invention to purvey comestibles in a preferably cashless transaction in a convenience store environment, notwithstanding the fact that other unrelated transactions may also occur as well. The difference implied by this implementation of the present invention is that there are no longer distinct zones such as operation zones, delivery zones, and the like. The system in accordance with the present invention thus takes on a more free-form contour, encompassing the preferably cashless transaction irrespective of actual or imaginary boundaries separating discrete functions in the preparation and delivery of unwrapped food.

While the invention has now been described with reference to certain preferred embodiments, those skilled in the art will appreciate that various substitutions, modifications, changes and omissions may be made without departing from the spirit thereof. Accordingly, it is intended that the foregoing description be deemed exemplary only and not limitative on the scope of the following claims.

What is claimed is:

1. A modular food service unit in which an operator assembles food preparations for a customer, said unit comprising a first module forming one side wall of the service unit, a second module mounted in a parallel spaced relation to said first module and forming the other side wall of the service unit, said second module forming an assembly and service counter, a third module abutting one end of said first module and said second module, said third module including a cooking device, and a fourth module abutting the other end of said first module and said second module to form a service area within said modules, said fourth module including a back wall for supporting an oven and a refrigeration unit, a storage unit positioned at the intersection of the second module with the fourth module, said first module including a self-service beverage station remote from the service area, and an order and payment module outside of said first, second, third and fourth modules whereby the operator may assemble unwrapped comestibles for delivery to the customer without contacting any item transferred from the customer to the order and payment module.

2. The modular unit according to claim 11 wherein said order and payment module is mounted at the intersection of said first module with said fourth module, said third module including means for displaying orders entered by the customer at the order and payment module.

* * * * *